June 15, 1943.  J. S. WEARN  2,321,960
DRIVE CONTROL MECHANISM
Filed Dec. 10, 1940
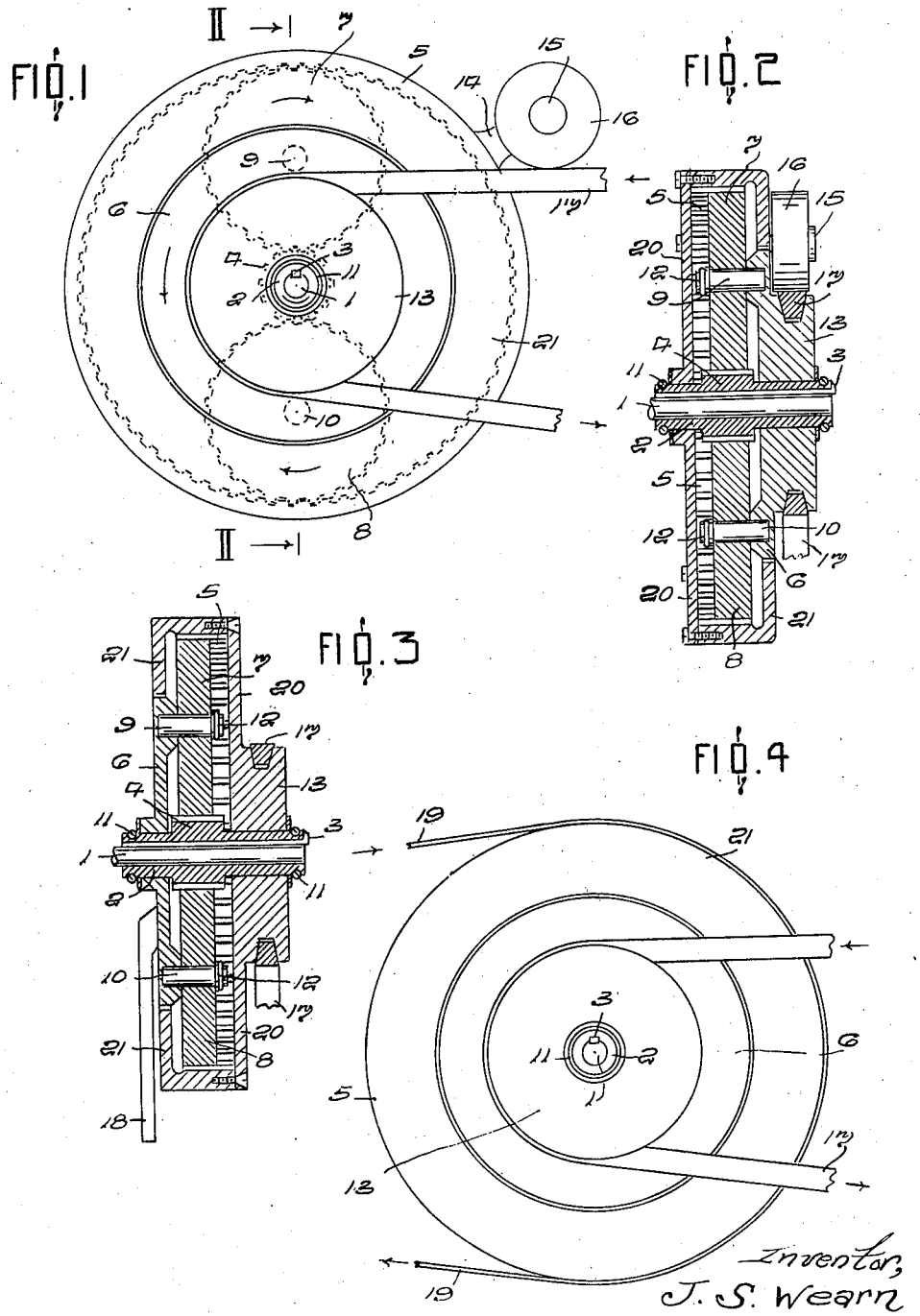
Inventor,
J. S. Wearn
By: Glascock Downing & Seebohm
Attys.

Patented June 15, 1943

2,321,960

UNITED STATES PATENT OFFICE 2,321,960

DRIVE CONTROL MECHANISM

James Stuart Wearn, St. Albans, Christchurch, New Zealand

Application December 10, 1940, Serial No. 369,508
In New Zealand December 18, 1939

3 Claims. (Cl. 74—280)

This invention relates to gearing employed to provide a desired speed change between a driving and a driven shaft.

In the case of a belt or chain drive, it is often impossible to obtain, in one stage, the necessary speed reduction from a high speed driving shaft, such as that of a standard electric motor, to operate a slow running machine, and in such cases it has been customary to provide the motor with a speed-reduction gear commonly contained in a gear-box which protects the gear-train and affords a means for mounting the spindles of the latter.

An arrangement of this kind is however both costly and cumbersome, often exceeding in size the motor itself, and in many instances is incapable of being conveniently employed.

It is the object of the present invention however to provide a pulley, or sprocket-wheel, of novel and special construction capable of being simply mounted upon the shaft in the customary manner and adapted to rotate at a suitably slower speed than the latter, the said pulley or sprocket-wheel being such also that it may serve as a means for maintaining the belt or chain at a suitable degree of tension thereby overcoming a difficulty that is liable to be encountered in connection with chains or in cases where the belt is of the endless V-section type.

The said pulley, or sprocket-wheel, although designed primarily for use upon a driving shaft, may, when desired, be applied to a driven shaft of a high speed machine when such is operated from a low speed source of rotary power.

In carrying this object into effect, the invention comprises essentially a pinion or sun-wheel adapted to rotate with the shaft, an internal gear-wheel journalled concentric with such shaft, and a planet-wheel or wheels, meshing with the said sun-wheel and internal gear-wheel, such planet-wheel, or wheels, being rotatably mounted on a member itself journalled concentric with the said shaft, and such internal gear-wheel and planet-wheel-carrying member being provided one with means operating to restrain its rotation and the other with a belt-pulley or sprocket-wheel concentric with the shaft.

In order that the nature of the invention may be clearly understood, it will now be more fully described and explained with reference to the accompanying drawing, illustrating certain typical examples of the construction, and in which—

Fig. 1 is a side elevation of a belt-pulley in which the internal parts are indicated in dotted lines and illustrating an arrangement wherein the internal gear-wheel is retained against rotation while the planet-wheel-carrying member rotates with the pulley.

Fig. 2 is a cross-section along the line II—II, Fig. 1,

Fig. 3 is a cross-section showing an arrangement in which the internal gear-wheel rotates with the pulley while the planet-wheel-carrying member is held from rotation, and, Fig. 4 is a side elevation of an arrangement similar to that of Figs. 1 and 2, but in which the outer periphery of the internal gear-wheel is employed as a belt-pulley to provide a drive in the opposite direction to that of the pulley attached to the planet-wheel-carrying member.

As here shown, upon a shaft, as 1, is provided a sleeve 2 drivably secured to such shaft as by a key 3 or other means.

Upon the said sleeve 2, at or about the mid-point of its length, is fixedly arranged, or formed integral therewith, a sun-wheel 4. Journalled upon the portion of the sleeve 2 to one side of the sun-wheel 4 is an internal gear-wheel 5, while upon the corresponding portion of such sleeve, to the other side of the sun-wheel, is journalled a member 6 carrying a planet-wheel, or pair of planet-wheels 7 and 8 each meshing with the sun-wheel 4 and with the internal gear-wheel 5, such planet-wheels being rotatable about axes, 9 and 10 respectively, fixed to the said carrying-member 6.

Suitable means, such for example as rings 11 sprung into circumferential grooves in the sleeve 2, or collars, are provided to retain the internal gear-wheel 5 and the planet-wheel-carrying member 6 upon such sleeve and similar means, as 12, may be provided to retain the planet-wheels 7 and 8 upon their respective axes 9 and 10.

If desired however, ball-bearings or other anti-friction means may be incorporated in the journalling of the said parts on the sleeve 2.

In one preferred form of the arrangement, as here shown in Figs. 1 and 2, the belt-pulley 13, or sprocket-wheel, is attached to or formed integral with the planet-wheel-carrying member 6 to rotate therewith, while the internal gear-wheel 5 is restrained from rotation by means of a part or arm 14 projecting therefrom and upon which arm is rotatably mounted, as by means of an axis 15, a roller 16 adapted to bear upon the belt 17 passing around the pulley 13, or to similarly bear upon the chain in cases where a sprocket-wheel is substituted for the pulley.

Again, as shown in Fig. 3, the pulley 13 may be attached to or formed upon the internal gear-wheel 5 to rotate therewith and in which case the planet-wheel-carrying member 6 will be provided with means for restraining its rotation and which means may consist, as here shown, of an arm or projection 18 adapted to engage or come in contact with an external object, such for instance as a floor or other fixture.

Obviously however, for the purpose of thus restraining its rotation, the planet-wheel-carrying member 6 might, in lieu of the arm 18, be provided with an arm carrying a roller adapted to bear against the belt 17 in a manner identical with that of the roller 16 already described in connection with the arrangement shown in Figs. 1 and 2, while similarly, in the case of the latter arrangement, an arm or projection, operating in the same manner as the arm 18, might be substituted upon the internal gear-wheel 5 for the arm 14 and roller 16.

Again, in cases where the pulley is fitted to the shaft of an electric motor or other machine, the necessary restraining from rotation of the part, consisting either of the internal gear-wheel 5 or the planet-wheel-carrying member 6, as the case may be, may be accomplished by providing such part with a boss or member secured, as for instance by means of a set-screw, to a boss or other stationary part of such motor or machine.

Thus for instance, as shown in Fig. 4, in which the arrangement is identical with that of Figs. 1 and 2, save for the absence of the arm 14 and its roller 16, the restraint of the internal gear-wheel 5 is achieved by mounting a belt 19 thereon and using the wheel 5 as a pulley to drive a load in the opposite direction to the drive provided by the belt 17.

In a preferred form of the construction, as here shown, the internal gear-wheel 5 will be shrouded at its lateral sides by disc-portions one of which, as 20, will include at its central part the bearing whereby such wheel is journalled upon the sleeve 2, while the other disc-portion, as 21, will be formed with a central aperture wherein is freely admitted the planet-wheel-carrying member 6.

The arrangement is such therefore as to provide a housing enclosing the gear wheels and adapted to contain a supply of lubricant which will be available to the contained parts.

In operation, it will be appreciated that the sun-wheel 4, rotating with the shaft 1, will rotate the planet-wheels 7 and 8 about their axes 9 and 10 and which wheels consequently rotate in opposite directions to each other and drive the internal gear-wheel 5 in the opposite direction to the sun wheel 4, with the result that the latter and the planet-wheel-carrying member 6 will tend to rotate in opposite directions to one another at lower speeds than the shaft 1, while conversely, rotation of the said parts 5 and 6 in opposite directions will tend to rotate the shaft 1 at a higher speed than such parts 5 and 6.

In the form of the construction shown in Figs. 1 and 2, however, the internal gear-wheel 5, being held from rotation by contact of its roller 16 with the belt 17, will cause rotation of the shaft 1 to produce rotation, at a relatively lower speed, of the planet-wheel-carrying member 6 and with it the pulley 13, or alternatively, where the shaft 1 is a driven shaft, rotation of the pulley 13 will serve to rotate such shaft at a relatively higher speed.

Further, by reason of the tendency of the internal gear-wheel 5 to rotate in the same direction as the pulley, such gear-wheel will cause the roller 16 to exert a pressure on the belt 17 proportional to the load driven by such belt, thereby keeping the latter at a desirable tension and taking up any slack that might otherwise exist.

Again, in the arrangement shown in Fig. 3, the planet-wheel-carrying member 6 being held from rotation, the internal gear-wheel, and with it the pulley 13, will rotate at a lower speed than the shaft 1, while, in the case of the arrangement shown in Fig. 4, it will be necessary for the load driven by one of the belts to be greater than that driven by the other.

Thus, assuming that the load driven by the belt 19 is the greater, it will hamper or retard rotation of the internal gear-wheel, thus enabling the planet-wheel-carrying member to rotate but at a speed reduced by the turning in the reverse direction of the internal gear-wheel.

It will be seen that the invention is such that it may readily be applied by simply slipping the sleeve 2 upon a shaft and drivably securing it, as by a key 3 or other means, without any external mountings and in which condition it will occupy a space little greater than that of an ordinary pulley or sprocket-wheel, while, in cases where the rotation restraining means consists of a part adapted to bear upon the driving belt or chain, it will afford a convenient and effective take-up enabling a satisfactory driving condition of such belt or chain to be maintained.

I claim:

1. A drive control mechanism for rotatable driving and driven shafts including a sleeve mounted on and keyed to a shaft for rotation therewith, a sun wheel carried with said sleeve intermediate the ends thereof, a three part housing arranged concentrically about said sleeve, at least two parts of the housing being mounted for independent rotation with respect to one another, a ring gear arranged concentrically of said sun wheel and formed integral with the internal periphery of the third housing part in turn carried by one of the rotatable parts, a pair of oppositely arranged planet wheels meshing with the ring gear and the sun wheel and mounted on one of the rotatable housing parts, the housing parts completely enclosing the gears and containing a lubricant for the gears, means on one of the rotatable housing parts to restrain its rotation and a belt pulley mounted on the other of the rotatable housing parts and arranged concentric to the shaft.

2. A drive control mechanism as claimed in claim 1 in which one of the rotatable housing parts is constructed in the form of a plate-like cover and means for detachably connecting said part to the third housing part which carries the ring gear.

3. A drive control mechanism as claimed in claim 1 in which the means operating to restrain rotation of the carrying member comprises an arm projecting from said member and provided with a roller adapted to bear against a belt driven by the said belt pulley to act as a take up to maintain the belt at suitable tension.

JAMES STUART WEARN.